United States Patent [19]

Stengel

[11] Patent Number: 5,718,930
[45] Date of Patent: Feb. 17, 1998

[54] DEVICE FOR REMOVING CAST MOLDED PARTS

[75] Inventor: Frank Stengel, Rossleben, Germany

[73] Assignee: Mannesmann Aktiengesellschaft, Dusseldorf, Germany

[21] Appl. No.: 563,496

[22] Filed: Nov. 28, 1995

[30] Foreign Application Priority Data

Nov. 28, 1994 [DE] Germany .......................... 44 44 395.1

[51] Int. Cl.⁶ ........................................................ B29C 45/40
[52] U.S. Cl. ............................ 425/556; 425/438; 425/577
[58] Field of Search ................................ 425/436, 438, 425/556, 577, 809

[56] References Cited

U.S. PATENT DOCUMENTS

| | | | |
|---|---|---|---|
| 3,053,221 | 9/1962 | Heffley et al. | 425/809 |
| 3,712,786 | 1/1973 | Aoki | 425/438 |
| 3,729,283 | 4/1973 | Eggenberger et al. | 425/556 |
| 3,807,924 | 4/1974 | Mingotti | 425/809 |
| 4,645,446 | 2/1987 | Ikehl | 425/556 |
| 4,958,676 | 9/1990 | Kuntz | 425/438 |
| 5,122,051 | 6/1992 | Joyner | 425/556 |

FOREIGN PATENT DOCUMENTS 45-24028-R  8/1970  Japan .................................. 425/438

*Primary Examiner*—James P. Mackey
*Attorney, Agent, or Firm*—Cohen, Pontani, Lieberman, Pavane

[57] ABSTRACT

A device for removing cast molded parts from a mold of an injection molding machine, the device including a carrier plate connected to a movable mold plate and spaced therefrom by spacer elements. A screw-out motor is provided on the carrier plate coaxially to the central axis of the mold, and the motor shaft journal runs through a central bore in the carrier plate. At least two ejector cylinders that are axially parallel to the mold central axis are attached to the carrier plate and have piston rods which run through openings in the carrier plate. An ejector plate is attached at the head end of the piston rods and has a central bore through which a drive-side shaft part of the screw-out motor runs.

3 Claims, 2 Drawing Sheets

DEVICE FOR REMOVING CAST MOLDED PARTS

BACKGROUND OF THE INVENTION

Field of the Invention

The invention relates to a device for removing cast molded parts from a mold of an injection molding machine having a movable molding plate, especially for plastic. More particularly, the invention relates to a device for removing plastic molded parts.

DE 3839445 teaches a device for removing molded parts from a molding machine of an injection molding machine for plastics,which device reaches into the machine in order to remove the molded parts and discards the removed pans at an established location outside of the injection molding machine. To this end, a frame is attached to the closing unit of the injection molding machine, which can be moved on a carriage and has a gripping arm. Gripping tongs are arranged at the head end of the gripping arm for gripping the molded parts.

This expensive and high-maintenance device is able to grip only molded parts that can be handled immediately after molding. The known device is not able to carry out a rotational movement, such is required in the case of casting ejection of threaded cores.

An ejection device for injection molding machines having an ejector plate is known from DE 3542878, in which, along with spacing pieces, ejector cylinders having associated ejector pins are provided. In the case of this ejector plate, which is completely configured with ejector elements, there is no room for a screw-out device.

During the processing of plastic in injection molding machines, as well as during the use of metal mold-casting machines, it is often necessary to produce molded parts having threaded bores. This is usually accomplished as follows: Cores are inserted into the hollow space of the mold and plastic is sprayed around these cores, so that threaded borings, for example, are formed in the molded part. In order to remove the molded parts from the mold, it is necessary to screw the threaded core out of the molded part. As this is done, the molded part is either pressed out of the mold or released in such a manner as to then be pressed out of the mold by means of an ejector device. Usually, the threaded cores of the molds, as well as the ejector device, are driven by special devices on the injection molding machine. These special drive devices are located on the back of the movable mold mounting plate and consist of a screw-out device, which drives a centrally arranged shaft on the mold, and an ejection device that can axially move several ejector pushers arranged symmetrically around the shaft on the mold. As a rule, the device is driven by the machine hydraulics system. The structure of these devices is complicated and they are expensive to operate and maintain.

SUMMARY OF THE INVENTION

Accordingly, it is an object of the present invention to provide a device for removing molded parts which can be adapted to different mold requirements without extensive alterations, especially without limitations on the ejection stroke and with the alternative use of molds having central ejectors.

The inventive device includes a carrier module, which is braced against the mold mounting plate and on which a screw-out motor is centrally arranged. Additionally, ejector cylinders are arranged parallel to the center axis of the screw-out motor. The piston rods of the ejector cylinders are connected to an ejector plate, which has an opening in the center axis, through which the drive-side shaft part of the screw-out motor runs. The ejector piston rods are axially parallel and pass through openings in the carrier plate.

In this way, the otherwise customary practice of attaching a gear unit to the back of the movable mold mounting plate so that the central boring shaft of the mold reaches into the drive-side sleeve of the gear and the driving motor is arranged outside of the center, is avoided.

The central arrangement of the boring device according to the invention achieves the following benefits:

1) No limitations are placed on the ejection stroke in dependence on the gear dimensions.
2) No disassembly of the gear unit is necessary when molds without threaded cores, but with central ejector pushers, are used;
3) Coupling the ejector pushers is not made more difficult when the mold is installed and thus high assembly expense is avoided when the mold is changed;
4) When molds having boring shafts of deviating geometries are used, the gear unit does not have to undergo alteration;
5) The boring shaft of the mold can be standardized, because the position of the power transmission elements on the boring shaft no longer depends on the distance between the gear unit and the mold clamping surface of the movable mold mounting plate.

In an advantageous further embodiment of the invention, the drive-side shaft and the output-side shaft, which is mounted on the journal of the screw-out motor, are braced against one another by a spring element, so that the drive shaft automatically adjusts to various lengths of the boring shaft of the mold and only the output-side shaft needs to be exchanged for various geometries of the boring shaft of the mold.

In still another embodiment of the invention, the carrier module is slipped onto stay bolts, whereby the bore has a diameter such that a ring clamping element can be used in order to secure the base plate against axial movement at any desired distance along the stay bolts.

In yet another embodiment of the invention, mold elements are provided on the ejector plate in a region of the central bore. A coupling of an ejector pusher being placeable on the mold elements.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
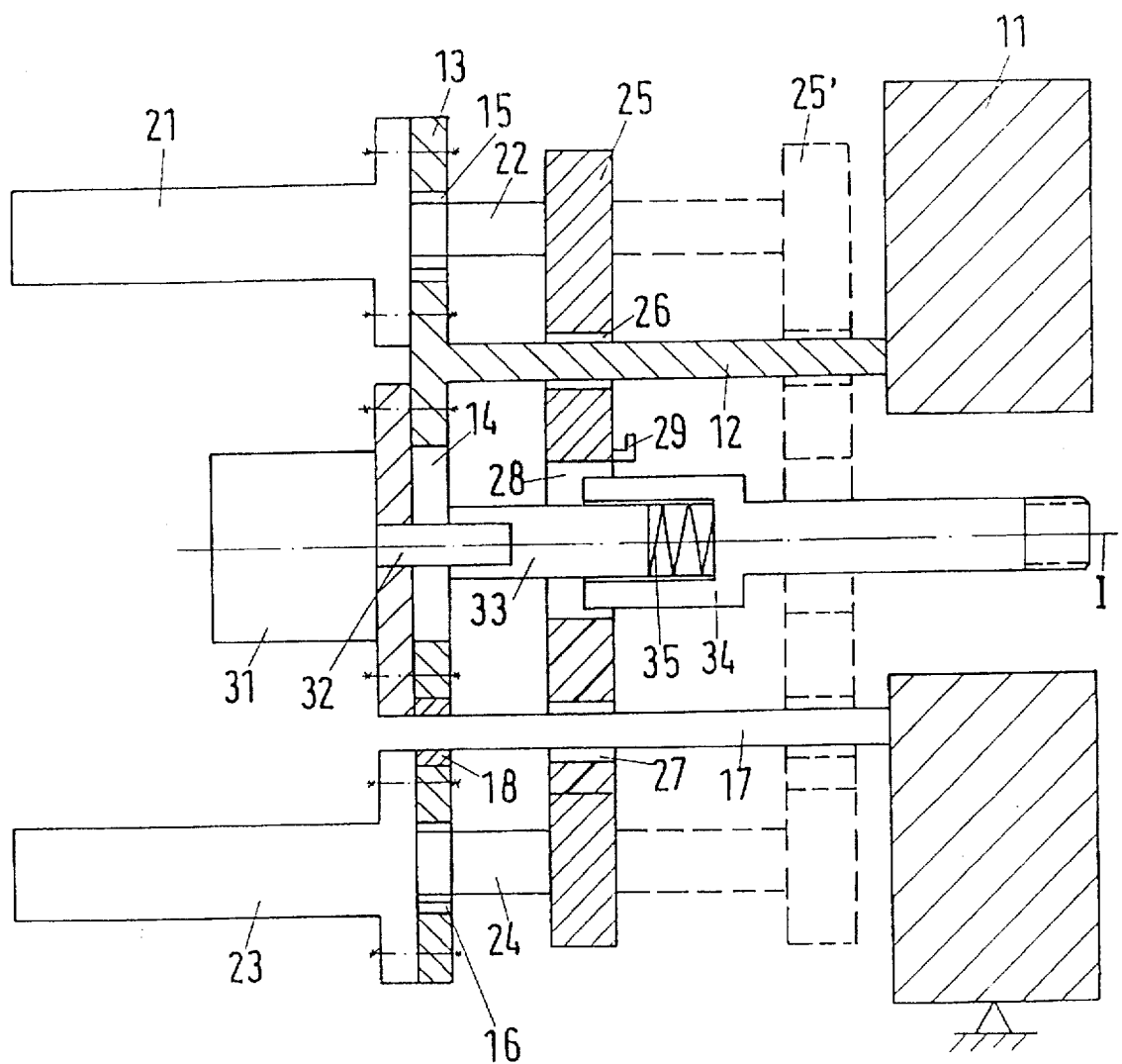
FIG. 1 is a section through the inventive device.

FIG. 1 shows a movable mold plate 11, to which a carrier plate 13 is attached by spacers 12. The carrier plate 13 has a central bore 14 and openings 15, 16 through which piston rods 22, 24 of ejector cylinders 21, 23 run. The ejector cylinders 21, 23 are attached to the carrier plate 13. An ejector plate 25 is attached to the head end of the piston rods 22, 24 and has openings 26, recesses 27 and bores 28. A shaft runs through the bore 28 and consists of a drive-side part 33 and a output-side part 34. The drive-side part 33 is braced from the output-side part 34 by a spring element 35 and is mounted on a motor shaft journal 32 of a screw-out motor 31.

As shown in the upper portion of FIG. 1, the carrier plate 13 is connected to the movable mold plate 11 in an evenly-spaced manner via the spacer 12. In the lower portion of FIG. 1, stay bolts 17 are provided, which fasten the movable mold plate 11 with the carrier plate 13 by ring elements 18 and permit stepless spacing.

Figure 2:
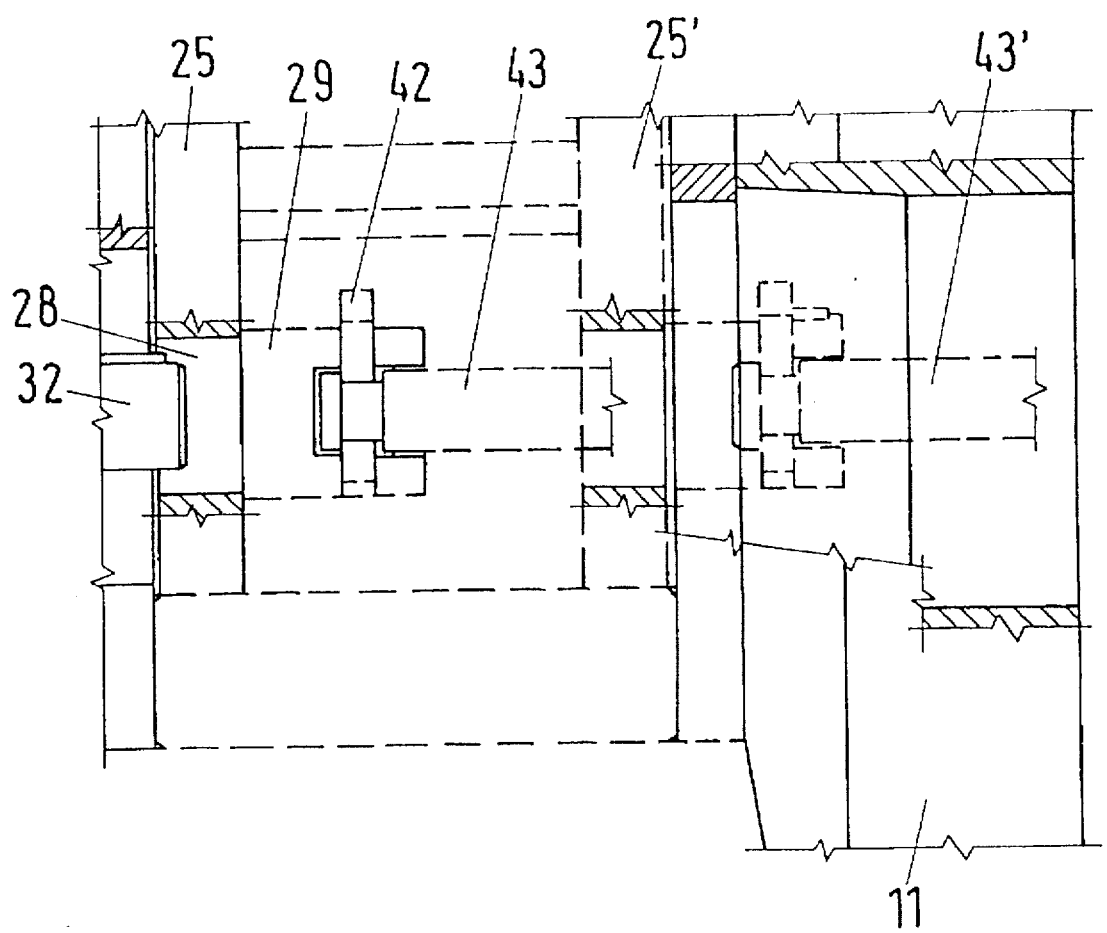
FIG. 2 is a section of an embodiment of an ejector element.

FIG. 2 shows the ejector plate 25, in the central bore 28 of which there is a mold element 29, to which an ejector pusher 43 is coupled by a coupling 42. The ejector pusher marked as 43' reflects the operating position when the ejector plate 25' is advanced to eject the mold.

The invention is not limited by the embodiments described above which are presented as examples only but can be modified in various ways within the scope of protection defined by the appended patent claims.

I claim:

1. A device for removing cast molded parts from a mold of an injection molding machine having a movable mold plate and a center axis, comprising:

a carrier plate connectable to the movable plate, the carrier plate having a central bore and through-openings parallel thereto;

means for spacing the carrier plate from the movable plate;

a screw-out motor mounted on the carrier plate coaxially to the mold center axis, the motor having a motor shaft journal that runs through the central bore in the carrier plate and a two-part drive shaft connected to the shaft journal, the two-part shaft including a drive-side shaft part and an output side-shaft part;

a spring element arranged between and mutually bracing the drive-side shaft part and the output-side shaft part so as to permit relative axial movement therebetween;

at least two ejector cylinders axially parallel to the mold center axis and attached to the carrier plate, the ejector cylinders having piston rods that run through the through-openings in the carrier plate and terminate at a head end; and an ejector plate having a central bore and being attached to the head end of the piston rods so that the drive shaft of the screw-out motor passes through the central bore in the ejector plate.

2. A device for removing molded parts as defined in claim 1, and further comprising a mold element connected to the ejector plate in a region of the central bore, and an ejector pusher having a coupling connected to the mold element.

3. A device for removing molded parts as defined in claim 1, wherein the spacing means includes a stay bolt and a ring element that is detachably connectable to the carrier plate, the ring element being in connection with the stay bolt.

* * * * *